United States Patent [19]

Faulkner et al.

[11] 4,058,386

[45] Nov. 15, 1977

[54] METHOD AND APPARATUS FOR ELIMINATING EXTERNAL HOT GAS ATTENUATION IN THE ROTARY FIBERIZATION OF GLASS

[75] Inventors: Duane Harold Faulkner, Cambridge City, Ind.; Harvell Morton Smith, Denver, Colo.; Larry Edward Howard, Richmond, Ind.

[73] Assignee: Johns-Manville Corporation, Denver, Colo.

[21] Appl. No.: 725,072

[22] Filed: Sept. 20, 1976

Related U.S. Application Data

[63] Continuation of Ser. No. 544,097, Jan. 27, 1975, abandoned, which is a continuation-in-part of Ser. No. 317,557, Dec. 22, 1972, abandoned.

[51] Int. Cl.² .............................................. C03B 37/04
[52] U.S. Cl. ............................................. 65/6; 65/14; 264/8; 264/12; 425/7; 425/8
[58] Field of Search ................. 65/6, 8, 14, 15; 264/8, 264/12; 425/7, 8, 9

[56] References Cited

U.S. PATENT DOCUMENTS

| 3,357,807 | 12/1967 | Stalego ....................................... 65/6 |
| 3,485,611 | 12/1969 | Blaze ...................................... 65/8 X |
| 3,511,306 | 5/1970 | Warkoczewski .................... 65/15 X |
| 3,650,716 | 3/1972 | Brossard ................................... 65/6 |

FOREIGN PATENT DOCUMENTS

| 983,921 | 6/1951 | France |
| 41,923 | 10/1944 | France |

Primary Examiner—Robert L. Lindsay, Jr.
Attorney, Agent, or Firm—Robert M. Krone; Joseph J. Kelly

[57] ABSTRACT

By controlling the design and operational parameters in accordance with particular relationships fibers having an average diameter of 7 microns or less can be formed by passing molten material through orifices in a peripheral wall of a rotor without using conventional hot gas blast attenuation externally of the rotor. The primary fibers are broken into finite lengths to produce staple fiber by a plurality of relatively cool and relatively low pressure air streams which are circumferentially spaced about the rotor and which flow in a direction transverse to the direction of travel of the primary fibers as they exit the orifices in the rotor. The rotors utilized in the perferred embodiment of the present invention have a peripheral wall with at least 40,000 orifices having diameters of about 18 mils or less. As one of the design parameters, orifice diameter, changes during the life of the rotor, operational parameters are adjusted to maintain the desired relationships between the various design and operational parameters.

10 Claims, 6 Drawing Figures

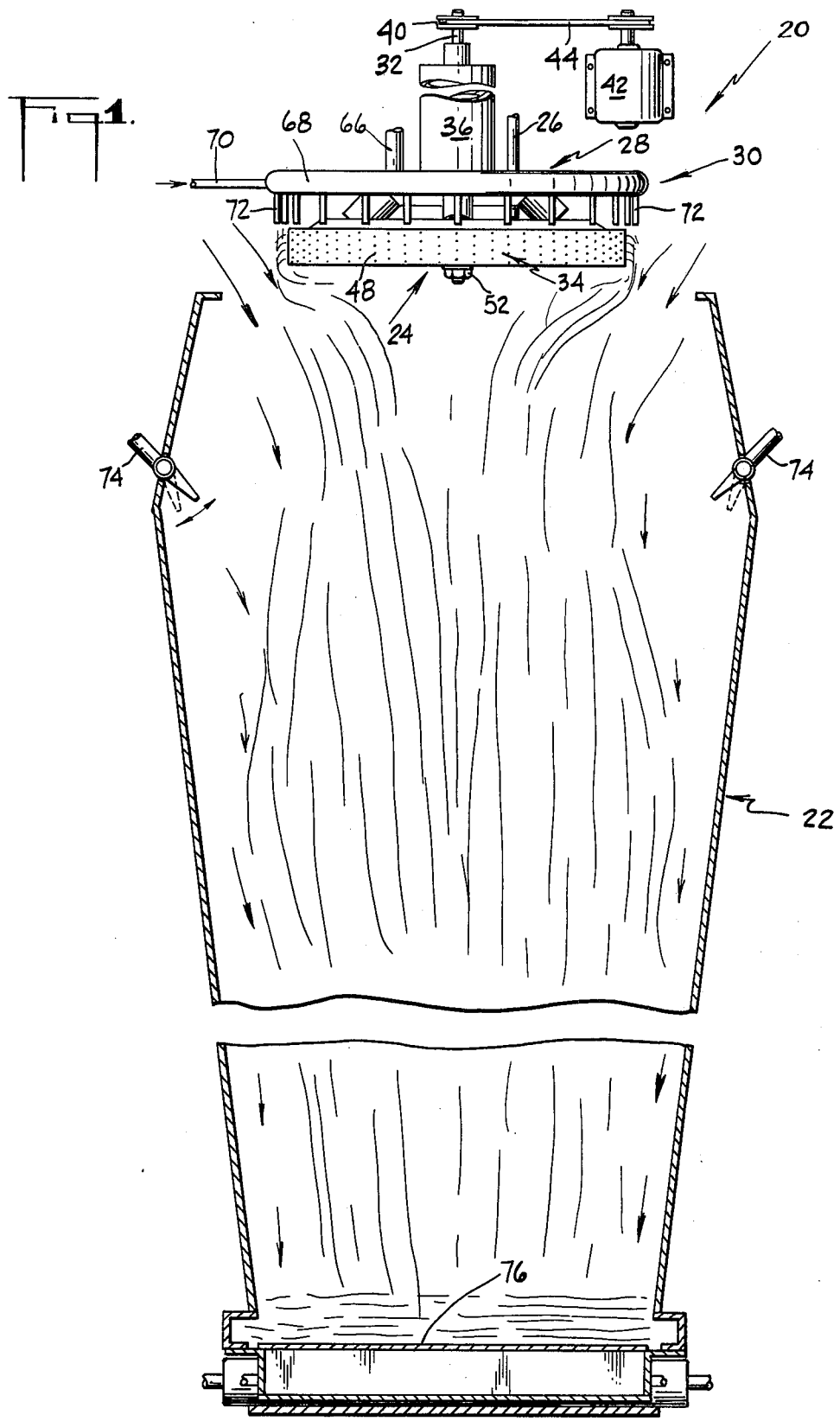

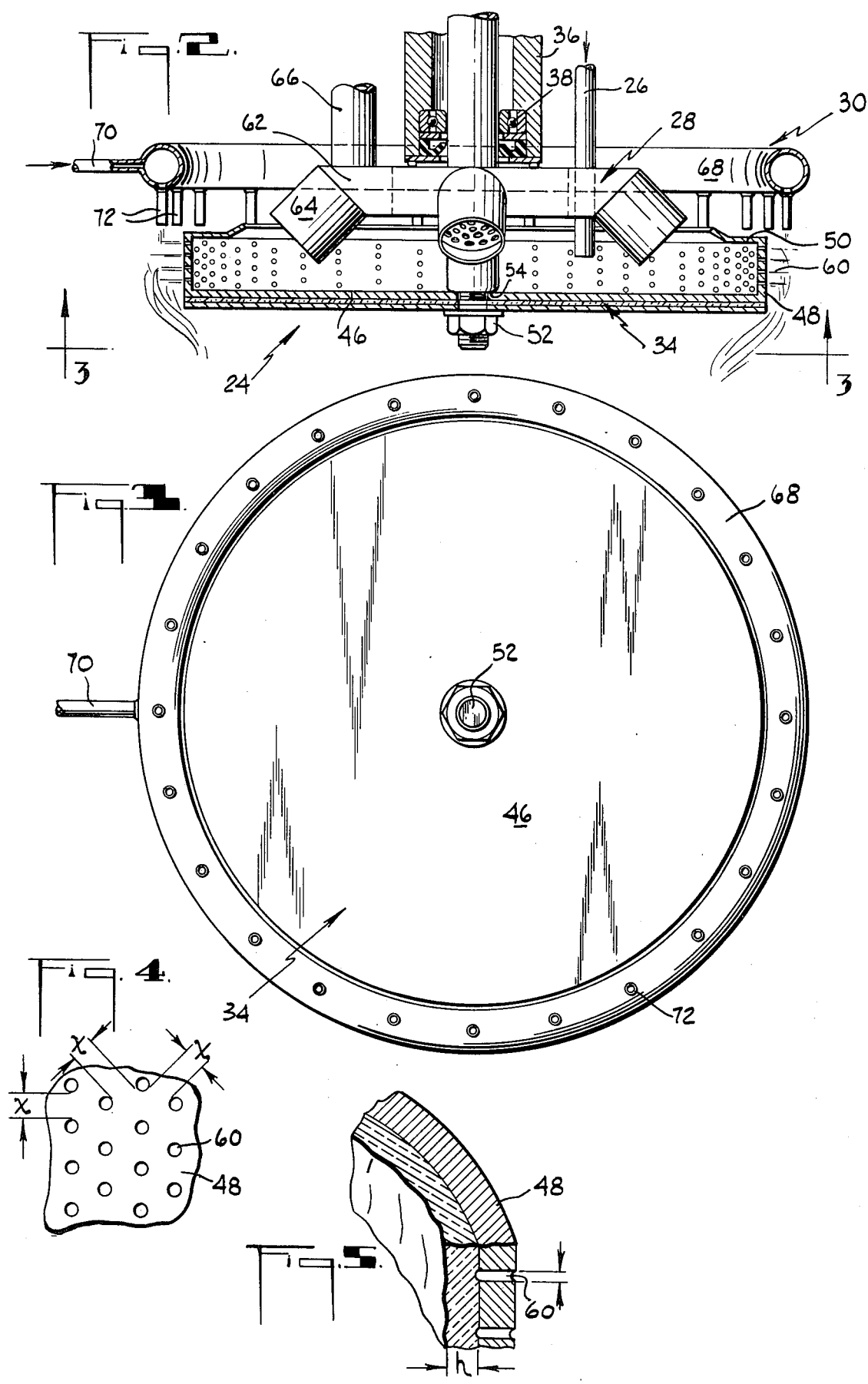

METHOD AND APPARATUS FOR ELIMINATING EXTERNAL HOT GAS ATTENUATION IN THE ROTARY FIBERIZATION OF GLASS

This is a continuation of application Ser. No. 544,097, filed Jan. 27, 1975, which application was a Continuation-In-Part of U.S. application Ser. No. 317,557 filed Dec. 22, 1972, both of which are now Abandoned.

This invention relates to a method and apparatus for forming fibers from molten mineral material such as glass and, in particular, to a rotary fiberizing apparatus and method for producing staple fiber of 7 microns diameter or less without using the conventional external hot gas attenuating technique.

BACKGROUND AND DISCUSSION OF PRIOR ART

The fiberization of molten mineral material such as glass can be accomplished by several known methods. One conventional method is rotary fiberization. At least as early as 1933 it was known to produce glass fibers by centrifugally forcing molten glass through perforations in the periphery of a rapidly rotating spinner or rotor followed by ripping the fibers apart by an annular air current traveling transverse to the emerging fibers, as evidenced by German Pat. No. 571,807. It has also been known, at least since 1940, to make glass fibers purely by the action of a rotary spinner, as shown by U.S. Pat. No. 2,192,944. After leaving the perforations in the periphery of the rotor, the fibers were attenuated somewhat due to their engagement with the relatively quiescent air surrounding the rotor, but, as reported in U.S. Pat. No. 2,431,205, the degree of attenuation caused by this effect is very limited. To increase the degree of attenuation and thus reduce the fiber diameter, this latter patent proposed to anchor the streams or fibers at a point removed from the rotor.

None of the above mentioned references revealed the diameter of the glass fibers produced by the disclosed processes, but later references evidenced that the fiber diameter was at least greater than 5 microns and than was possible using the more costly flame attenuation fiberizing technique, e.g., see U.S. Pat. Nos. 2,609,566 and U.S. Pat. No. Re. 24,708. The former patent proposed to correct this deficiency by subjecting the centrifugally drawn out primary fibers to further attenuation by the action of a transverse blast of hot gas. This gas had to have a temperature and a velocity sufficient to soften and attenuate the primary fibers. The gas blast was provided by the combustion of substantial quanities of fuel to produce a gaseous stream having a velocity of at least 1,200 feet per second and a temperature of at least 3,000° F.

From the issuance of U.S. Pat. No. 2,609,566 in 1952 and until now a large number of advancements have been made in the rotary fiberization field, but none have accomplished the manufacture of glass fibers having an average diameter below 7 microns, and particularly below 5 microns, without the necessity of also using a relatively high temperature gaseous blast to attenuate the primary fibers. It would be highly desirable to eliminate the hot gas blast or equivalent high energy usage attenuation step without sacrificing the desirably small fiber diameter it produces, particularly in view of the energy crisis and the resultant rapid increase in the prices of all fuels. For example, in a typical rotary fiberization process as much as about 7,000 to 8,000 cubic feet of natural gas is required for external jet blast attenuation for every ton of glass fiber produced. In a typical rotary fiberization process making 4-7 micron fibers by forcing the glass through 24 mil orifices in the rotor and attenuating the primary fibers with such a hot gaseous blast, the fiber diameter jumps to 10 to 15 microns when the burners providing the heat for the hot gaseous blast are turned off.

It has also been suggested in U.S. Pat. No. 3,511,306 to make the orifices in the rotor as small as 10 mils to make staple fiber having a diameter of 4 to 10 microns, but it was not recognized that, by carefully controlling the relationship between the process variables, the hot blast attenuation could be eliminated. This reference, typical of the prior art, included hot gas blast attenuation as one of the process steps.

While some of the above prior art processes produce staple fibers having diameters of 7 microns or less, these processes present several problems. The large volume of fuel such as natural gas utilized by such processes is not always readily available and acute shortages are forecast. Consequently, production can be interrupted or slowed by the unavailability of sufficient natural gas for the process.

It is desirable to eliminate the additional expense of providing the blast of hot gases for attenuation plus the maintenance and related problems associated with the burners used in the attenuating apparatus. Also, every fuel burning step produces pollutants that must be dealt with causing an additional operating expense. Finally, the additional heat added by the attenuating burners must be absorbed in the collection chamber prior to felting the staple fiber into a mat and frequently causes premature curing of the binder. This is undesirable and places a restriction on the type of binders that can be used.

BRIEF SUMMARY OF THE INVENTION

It is an object of the invention to produce staple fiber having diameters of 7 microns or less solely by passing molten material through orifices of a rotor into a plurality of relatively cold and relatively low pressure gas flows, thus eliminating the hot gas blast used in the prior art and the fuel usage associated therewith.

Applicants have discovered that it is possible to make glass staple fiber having an average diameter of 7 microns or less, preferably 5 microns or less, and most preferably 4 microns or less by passing molten mineral material such as glass through orifices in a peripheral wall of a rotor and into a plurality of relatively cool and relatively low pressure flows of air travelling transverse to and externally of the peripheral wall of the rotor. Rotors having a large number of orifices, e.g., at least 40,000, each having an initial diameter of less than about 18 mils, are able to form primary fibers having diameters of less than 7 microns, e.g., 3 to 5 microns, if the relationship between the process variables are controlled in accordance with particular relationships. It is even possible to produce sub-micron filaments using rotors whose orifice diameters are 2 mils or less.

By directing a plurality of air streams of relatively low temperature, e.g., below 300° F, preferably below 200° F, and most preferably below 150° F. or less, onto the primary fibers flowing from the orifices in the rotor at circumferentially spaced apart points about the periphery of the rotor and in a direction transverse to the direction of travel of the primary fibers as they issue from the orifices, the primary fibers are broken into staple fibers. With this arrangement, primary continuous fibers issue from the orifices and as the fibers pass through one or more of the air streams the continuous fibers are broken off and carried down into a collection chamber where the staple fiber is formed into a felt in a conventional manner. Because of the relatively low temperature of the air streams and the ambient air surrounding the rotor, at least the surfaces of the glass fibers are quickly cooled below the softening point of the glass. Thus, essentially no attenuation results from the forces of the air streams striking the primary fibers. Instead, the primary fibers are quickly cooled to a brittle state and are broken into staple fiber by the forces of the air streams.

The staple fibers formed by the process and apparatus of the present invention have a narrower diameter distribution and can be longer in length than the staple fibers produced by the prior art processes using hot gas blast attenuation. The length of the staple fiber can be varied as desired over a wide range as compared with conventional rotary produced fiber. Outputs at commercially feasible levels of production have been achieved with the process and apparatus of the present invention.

For the purpose of this application, the term "average diameter" when referring to the fiber diameter is used in the sense of the conventional arithmetic or mean diameter obtained by averaging results of a microscopic determination.

BRIEF DESCRIPTION OF THE DRAWINGS

FIG. 1 is an elevational view of the apparatus of the present invention positioned over a collection chamber that is shown in cross section.

FIG. 2 is a cross sectional view through the apparatus of the present invention.

FIG. 3 is a bottom view of the apparatus of the present invention taken substantially along lines 3—3 in FIG. 2.

FIG. 4 is a fragmentary view of a portion of a band of orifices of a typical rotor used in the apparatus of the present invention.

FIG. 5 is a fragmentary cross sectional view through the band or peripheral wall of the rotor to illustrate the build up of glass on the interior of the wall.

DETAILED DESCRIPTION OF THE INVENTION

Figure 6:
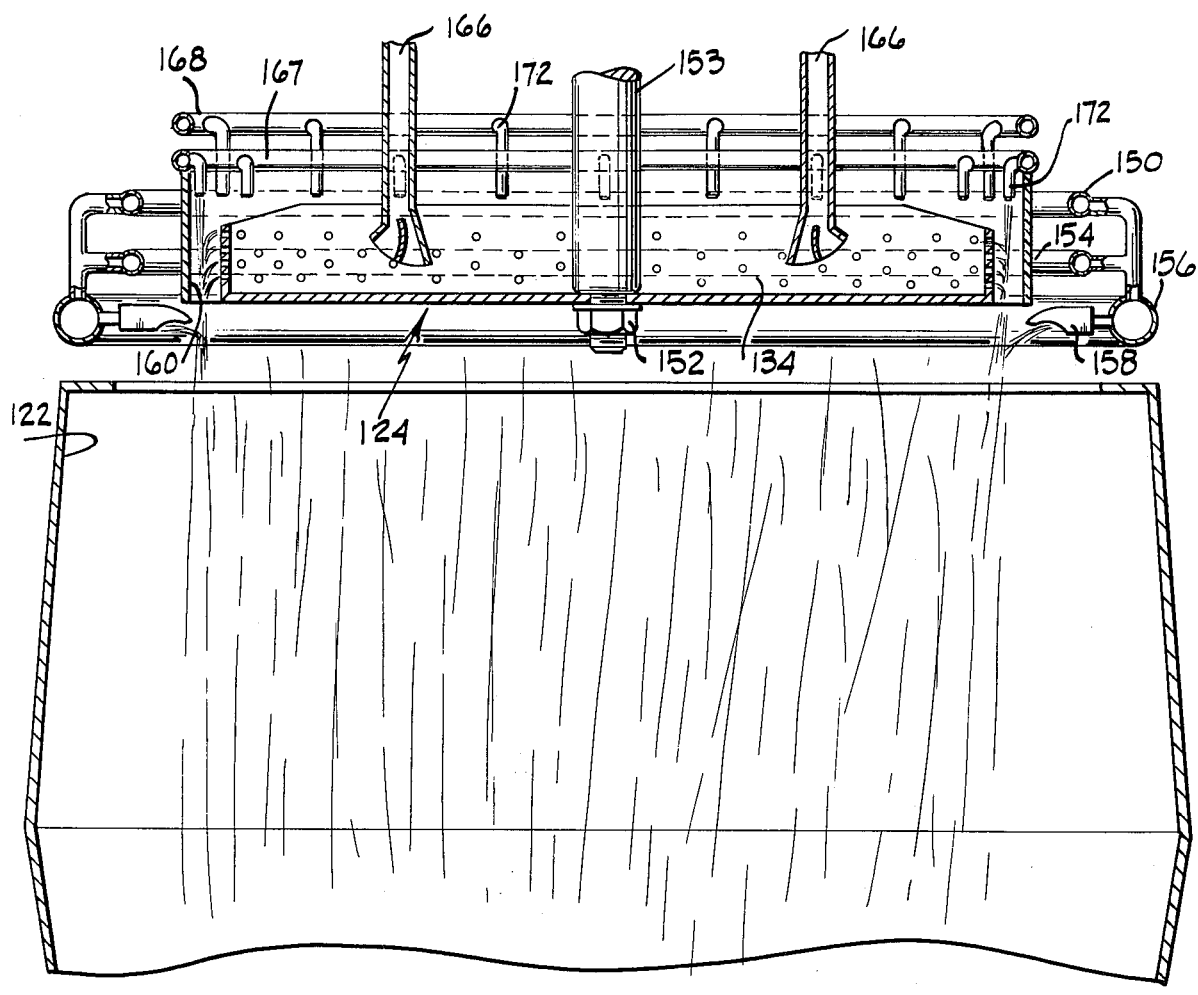
FIG. 6 is a cross sectional elevational view of a preferred embodiment of the apparatus of the present invention.

FIG. 1 illustrates the apparatus of the present invention 20 located over a conventional collecting chamber 22. The apparatus 20 comprises a fiberizing unit 24, a rotor heater assembly 28, and a stripper header assembly 30. The apparatus 20 is supported on conventional framework, but to better illustrate the apparatus the supporting framework has been omitted from the drawing.

The fiberizing unit 24 comprises a drive shaft 32 which carries a spinner or rotor 34. The drive shaft is supported by, and rotatably mounted within, a tubular housing 36 by means of a pair of bearing assemblies 38 (only one of which is shown in FIG. 2) that are mounted in the tubular housing 36. The upper portion of the drive shaft 32 is provided with a sheave 40. The sheave is connected to a variable speed motor 42 or other conventional drive means by belt drive 44. Thus the rotation of the spinner 34 is affected by the motor 42 which drives the drive shaft 32.

The rotor 34 comprises a bottom wall 46, a peripheral wall for the band of orifices 48 extending upwardly from the periphery of the bottom wall 46, and a reinforcing upper wall ring 50 extending inwardly from the upper edge of the peripheral wall 48. The rotor is typically 12, 15, 18, 24 or more inches in diameter and has a centrally located aperture through which a threaded portion of the drive shaft 32 passes. Smaller diameter rotors are operable, but are not desirable because the output per unit of height of the peripheral wall is undesirable low. A nut 52 on the threaded portion of the drive shaft plants the disc plate of the rotor between itself and a shoulder 54 of the drive shaft. The bottom wall 46 forms the floor of the rotor. The lower edge portion of the peripheral wall 48 is welded or otherwise affixed to the periphery of the bottom wall 46. The upper edge portion of the peripheral wall 48 is welded or otherwise secured to the upper reinforcing wall 50 which lends needed strength to the rotor when it is rotating at high speed at temperatures which tend to weaken the metal of the peripheral wall. The rotors can be a one piece casting made by known casting techniques, such as investment casting.

The peripheral wall 48 of the rotor is provided with a band containing a plurality of orifices 60 with the longitudinal axis of the orifices extending radially through the peripheral wall 48. In order to form primary fibers having an average diameter of 3 to 5 microns by passing glass through the orifices at a rate of at least 600 lbs. per hr. and into a plurality of relatively cool and relatively low pressure air flows moving transverse to and external of the peripheral wall, it is preferred to have at least 40,000 to 100,000 orifices in the peripheral wall with each orifice having an initial diameter ranging up to about 18 mils, preferably 12 mils, and most preferably up to about 10 mils or less. The spacing between orifices (see dimension X in FIG. 4) is typically about 36 mils, plus or minus about 10 mils.

One conventional heater assembly 24 comprises a manifold 62 provided with a plurality of commercially available radiant burners 64 which are oriented to direct their heat outwardly from the manifold at an angle of about 45° relative to the vertical. With this orientation, the hot gases from the burners and directed onto the interior of the peripheral wall 48 of the rotor to maintain the peripheral wall at temperatures sufficient to maintain the glass at the proper viscosity to produce the desired fiber diameter in accordance with the present invention. For typical glass compositions presently being used, the interior peripheral wall is usually maintained at a temperature in the range of about 1700° F. to 2100° F. A combustible mixture is supplied to the manifold 62 through supply line 66. The manifold is generally annular in shape and is so arranged to permit the molten stream of glass 26 to pass unimpeded to the bottom wall of the rotor.

The molten glass feed 26 flows from a suitable source (not shown) such as a forehearth, or other conventional glass melting and/or refining means, e.g. an electric furnace. The molten glass feed 26 enters the rotor at a point offset from its center. Due to the centrifugal forces generated by the rotation of the rotor, the molten glass flows toward the peripheral wall of the rotor and up the interior surface of the peripheral wall. When a sufficient head "h" (see FIG. 5) has been built up on the interior wall of the rotor, and when the other operational and design parameters are properly controlled, the molten glass is forced through the orifices by the centrifugal force of the rotor to form continuous primary fibers having an average diameter of 7 microns or less. The magnitude "h" can be controlled by controlling the rate of molten glass feed 26, the interior temperature of the rotor, and the rotational speed of the rotor.

The stripper head assembly 30 comprises an annular manifold 68 having a supply line 70 coupling the manifold with a conventional source (not shown) of pressurized gas, such as air. A plurality of tubes or nozzles 72 depend from the lower surface of the manifold 68. Typically these nozzles are standard ⅛ inches pipe nipples. Discharge ends of the nozzles are located in a plane substantially co-planer with an upper edge of the peripheral wall 48 of the rotor, or in a horizontal plane spaced only a few inches above the plane of the upper edge of the rotor peripheral wall. The nozzles 72 are circumferentially spaced apart around the periphery of the spinner with the nozzles being typically located radially outward from the periphery of the rotor about 1 to 1½ inches. If longer fibers are desired the nozzles can be spaced farther apart and/or moved further away from the rotor, e.g., 4 inches.

The nozzles 72 are spaced with respect to each other so that there are zones of relatively static or quiescent air between the adjacent gas streams flowing from the nozzles 72 downward pass the rotor 34. For example, when a 12 inch rotor is used the manifold 68 is typically 15 inches in diameter and is provided with 20 to 24 nozzles. The gas pressure inside the manifold can be varied and is typically maintained at about 15 psig, which will produce typical nozzle pressures of about 5 psig.

The temperature of the gas streams emitted by nozzles 72 is not critical so long as the temperature is below that that would be required to soften and thus attenuate the primary fibers. Normally compressed air is used whose temperature may be above room temperature due to the compression process and/or due to the transmission of the compressed air through a plant environment having a higher temperature than room temperature.

Any heat contained in the stripper header gas, because of its being at a temperature above the temperature of the air outside the plant, is purely coincidental because the advantage of the present invention is that it is not necessary to heat this gas to a temperature sufficient to promote and cause attenuation of the primary fibers. Its sole function is to cool and break the primary fibers into staple fibers, and to direct the staple fibers towards a collecting means.

With the circumferentially spaced apart nozzles 72 ringing the periphery of the rotor, the continuous fibers issuing from the rotor are subjected to a series of impulsive forces separated by regions of relatively static or quiescent air. In this way, the impulsive forces strike the fibers, cool, and break the fibers off to form staple fibers. By spacing the nozzles farther apart about the periphery of the rotor, staple fibers of longer lengths can be obtained. Up to a certain point, the closer the nozzles are placed to each other the shorter the length of the staple fibers formed. However, if the nozzles are placed too close together, a substantially continuous curtain of air is provided about the periphery of the rotor and the fibers are not broken up into staple fibers.

While air is the preferred fluid for use in breaking up the continuous primary fibers, other fluids can be used, either alone or in combinations. For example, it is possible to mix a binder with air, feed this mixture into the stripper head, and apply binder to the staple fiber simultaneously with their formation from the primary fibers.

In the formation of staple fiber by this process, the fluid streams are generally directed onto the primary fibers from the stripper head at substantially right angles to the direction of travel of the primary fibers. Angles other than 90° would also be suitable, e.g. angles greater than 90°.

In operation, the heater assembly 28 heats both the bottom wall 46 and the interior of the peripheral wall 48 of the rotor to a temperature sufficient to maintain the molten glass within the rotor 34 at the proper viscosity to produce primary fibers having the desired diameter. While many glass compositions conventionally used to form glass fibers are suitable for use in the present invention, it is preferred to use a glass composition having a relatively low temperature softening point and having suitable fiberizing viscosities at relatively low temperatures. Such a glass composition permits lower temperature rotor operation which extends the life of the rotor. The rotor life is dependent upon operating temperature, thus it is desirable to operate the rotor at as low as temperature as possible.

Molten glass is introduced to the rotor in the form of a stream of molten glass 26 at a rate sufficient to maintain a desired depth or head "h" sufficient to cause the flow of molten glass through the orifices to form continuous fibers of the desired diameter of 7 microns or less. As the primary fibers travel outward from the spinner they alternately pass through a fluid stream from a nozzle 72 and then relatively static quiescent air between the fluid streams whereby the fibers are subjected to cooling impulsive forces that break the fibers into staple fiber. The fluid streams from the nozzles 72 also direct the staple fibers down into the collection chamber 30.

Critical to the manufacture of staple fibers having diameters of less than 7 microns by rotary fiberization without using hot gas blast attenuation is the maintenance of particular relationships between the process design and operational variables. These variables are glass viscosity, glass density, total flow of molten glass to and from the rotor, orifice diameter, rotor speed (RPM), thickness of the glass layer or head "h" on the interior of the peripheral wall of the rotor, thickness of the peripheral wall of the rotor (orifice length), interior diameter of the rotor, and the total number of the orifices in the peripheral wall of the rotor. Some of these variables are design parameters, e.g., orifice diameter, number of orifices, and rotor diameter. Other of the variables such as glass viscosity, glass density, rotor speed, and total flow rate of molten glass in the form of primary fibers from the rotor are operational parameters.

Because of the erosion caused by the molten glass flowing through the orifices, the orifice diameter increases during the life of the rotor. To compensate for this change and to maintain the diameter of the primary fibers within the desired range, it becomes necessary during at least a portion of the rotor life to effectively decrease the height of the peripheral wall of the rotor. Techniques for achieving this result will be described in detail later in the specification.

The particular relationships critical to the formation of small diameter primary fibers of no more than 7 microns are represented by the following three formulas:

$$d_o = \frac{2}{\pi} \sqrt{\frac{F}{pDfN}} \quad (1)$$

$$d_o = .25 \left[ \frac{\pi f p h}{v l} \right]^{\frac{1}{2}} d^2 \quad (2)$$

$$h = \frac{64 \, vFl}{\pi^3 p^2 D f^2 d^4 N} \quad (3)$$

where $d_o$ = the average diameter of the fiber product;
$\pi$ = 3.14;
$p$ = glass density;
$v$ = glass viscosity;
$F$ = total glass flow through the rotor per unit of time;
$l$ = thickness of the peripheral wall of the rotor;
$D$ = interior diameter of the rotor;
$f$ = rotor speed;
$d$ = diameter of the orifices; and
$N$ = total number of orifices in the rotor.

In determining the design and operational parameters necessary to produce primary fibers having the desired diameter without hot gas blast attenuation the following procedure is used.

First, a suitable glass composition is selected for use in the process. A viscosity versus temperature curve and the glass density for this glass are determined using well known techniques. Next, working with Formula (1) above, values for various parameters are selected on the basis of the results desired and the desired operating conditions. For example, the desired diameter of the primary fibers, $d_o$, is selected. The glass density is known. A suitable rotor speed, $f$, is selected, the rate of primary fiber production, $F$, is selected, and finally the diameter of the rotor, $D$, is selected. Having selected these parameters, Formula (1) above is then solved to determine the total number of holes or orifices, N, needed in the peripheral wall of the rotor. At this point, if the total number of holes, N, is excessive to permit adequate spacing between orifices it will be necessary to go back and select another set of parameters, differing in at least one respect from the initial set selected. It will be readily apparent to one skilled in the art, having the benefit of the disclosure of Formula (1), how to modify the selection of the parameters to produce a smaller N value.

Once a suitable N value has been determined, a rotor operating temperature is selected and the corresponding viscosity of the glass at that temperature is taken from the viscosity versus temperature curve. Then using Formula (3) above, and after selecting a peripheral wall thickness which typically should fall between 50 and 250 mils, and selecting an "$h$" value which typically should fall between 1/32 and ½ Inch, Formula (3) is solved to determine the orifice diameter, $d$. This diameter should be less than 18 mils, preferably within the range of about 6 to 13 mils, and most preferably about 8 to 12 mils.

As will be apparent to one skilled in the art from the above relationships there are several combinations of variables which will produce the desired primary fiber diameter. This feature offers flexibility to select specific values for those parameters which are the most critical to economical fiberization and to adjust the other parameters accordingly to produce the desired fiber diameter.

The following examples illustrate two embodiments utilizing the method and apparatus of the present invention. The first embodiment represents the preferred mode of operation and the second example represents one of numerous alternative embodiments that can be practiced.

EXAMPLE 1

Three to five micron staple fiber was produced using the apparatus illustrated in FIG. 6. The apparatus included an 18 inch diameter rotor having a peripheral wall height of 1¼ inches and a peripheral wall thickness of about 125 mils. The rotor contained 50,000 orifices, each having an average diameter of about 10 mils. The initial rotor speed was set at 2200–2300 RPM and the molten glass feed was adjusted to 1000 lbs/hr, which was sufficient to produce an $h$ value nominally of ⅛ inch and which varied between 1/16 and 3/16 inch. The burners heating the interior of the rotor were adjusted to produce an initial rotor interior temperature of about 1850°–1900° F.

The glass composition used in this example contained, on an oxide weight basis, 55.1% silica, 17.1% soda, 13% lime, 9.3% $B_2O_3$, 3.5% alumina, 0.9% potash, 0.6% magnesia, 0.1% iron oxide and 0.1% sulphur trioxide with the remainder being made up of traces of other oxide impurities. This glass has a glass density of 2.6 gm/cc, a softening point of 1217° F, and a viscosity at 1850°–1900° F of about 500–325 poise respectively and the rotor was made of an alloy typically containing about 0.28% carbon, 27.8% chromium, 2.5% nickel, 5.8% molybdenum, 1.8% iron, and the balance cobalt, on a weight basis. The stripper head pressure was maintained at about 15 psi which produced a nozzle pressure of about 5 psi in 24 nozzles equally spaced around a 21 inch diameter stripper head manifold.

Operating under these design and operational parameters this apparatus and process produced about 1000 lbs. per hour of staple fiber having an average diameter in the range of 3–5 microns.

EXAMPLE 2

Using the same glass composition and rotor material as described in Example 1, a 15 inch diameter rotor having a 2 inch high peripheral wall 125 mils thick and containing 50,000 orifices of 10 mil diameter produced essentially the same product and at essentially the same rate as the apparatus and process of Example 1. It was necessary to increase the initial rotor speed to a value in the range of about 2800–3000 RPM but the rotor interior temperature, $h$ value, glass density, and viscosity and molten glass flow rate were at the same values used in Example 1. The stripper manifold pressure was maintained at about 15 psi.

In selecting the rotor diameter, the rotor peripheral wall thickness, and the materials to be used in making the rotor for use in the present invention several factors must be considered. First, as evidenced from Formulas (1) and (3) above, the rotor diameter can be adjusted to allow adjustment in other operational parameters. Second, as the rotor diameter is increased the area of the peripheral wall also increases if the peripheral wall height is not changed. Thus, the height of the peripheral wall can be decreased as the diameter increases, to hold the area constant. This factor is very important because as the height of the peripheral wall increases there is more of a tendency, due to the centrifugal forces developed during operation and the high temperature at which the rotor must operate, for the peripheral wall to deform outwardly at its center. When this happens the orifice diameters change, the "$h$" value no longer remains constant, and the useful life of the rotor is essentially ended. Thus, it is desirable to keep the height of the peripheral wall as low as possible.

In selecting the thickness of the peripheral wall one must balance the strength that increased thickness provides with the increased mass that accompanies an increased thickness. An increased peripheral wall mass increases the tendency for the peripheral wall to warp or deform at operational speeds and temperatures. A suitable operating range for the peripheral wall thickness, with the alloy disclosed in Example 1, has been found to be in a range of about 50 –250 mils. A peripheral wall thickness of less than about 50 mils does not produce the desired structural strength in the rotor, and a peripheral wall thickness greater than about 250 mils is not only difficult to penetrate by conventional laser drilling techniques, or other equivalent techniques of forming the orifices, but also adds excessive weight or mass onto the peripheral wall, reducing its ability to maintain structural integrity at operating conditions.

The preferred alloy for use in making the rotor is disclosed in Example 1 and represents a balance between high temperature structural strength and resistance to erosion and corrosion by the molten glass passing through the orifices. Other alloys are available that have greater resistance to high temperature creep or deformation under stress. While rotors of such alloys could be operated at higher RPMs, higher temperatures, and/or greater peripheral wall heights without deformation, the orifices were eroded faster by the glass flow through the orifices, thus reducing the life of the rotor. Some alloys tested had greater resistance to erosion by the molten glass, but their creep resistance was insufficient to resist the deformation tendencies at operating temperatures for sufficient periods of time.

The design and operational parameters selected according to the above described procedures are initial parameters. As mentioned earlier, one of the design parameters, orifice diameter, changes as the rotor life increases, and thus one or more other parameters must be changed accordingly to compensate for the change in the orifice diameter in order to retain the desired diameter in the staple fiber produced. Formula (2) above is useful in determining which parameter(s) should be changed, and how much they should be changed, to compensate for the change in the orifice diameter, $d$. Looking at Formula (2) it can be seen that as $d$ increases it is necessary to either decrease the rotor speed and/or to increase the viscosity of the glass in order to keep $d_o$ constant. The glass density and the thickness of the peripheral wall are not adaptable to modification during the operation of the rotor. To compensate for an increasing orifice diameter during the life of the rotor, it is preferred to first increase the glass viscosity by lowering the temperature on the interior of the rotor, to maintain a constant fiber diameter in the staple fiber product, until that temperature is reached which is just above a temperature that would cause devitrification problems in the molten glass in the rotor, i.e., just above the liquidus temperature. Once that point is reached the rotor speed is increased to compensate for the reduction in the number of holes emitting primary filaments, N, due to increasing d value (see Formula 1). The "$h$" value must be maintained above a minimum value of about 1/32 inch to maintain the desired fiber diameter. When a maximum practical rotor speed is reached it is then necessary to put on a new rotor in order to continue to make primary fibers having the desired diameter of 7 microns or less. Experience has shown that, when the process parameters are so adjusted to produce a maximum rotor life, primary fibers are being formed from the orifices in only about the lower one-half of the peripheral wall during the final stage of the rotor life. Thus during the latter portion of the rotor life the effective height of the peripheral wall is reduced.

FIG. 6 is an elevational cross section of a preferred apparatus of the present invention. The apparatus comprises a one piece cast rotor 124 containing at least 40,000 laser drilled orifices, each having a diameter of about 10 mils, in its peripheral wall 134. The rotor is mounted on the spindle 153 with nut 152 and is driven in the same manner as the rotor illustrated in FIG. 1. The temperature of the interior rotor is maintained by controlling the amount of fuel/air mixture burners 166. Preferably three of the burners 166 are used, but more or less can be used if desired. Although preferred, it is not necessary to space the burners exactly in an equidistant relationship around the rotor.

In the preferred apparatus two stripper manifolds, 167 and 168, are used and the nozzles 172 are L shaped to allow the manifolds to be moved away from the area immediately above the fiberizing area. Standard $\frac{1}{8}$ inch nipples can be used for the nozzles 172. With the manifolds out of the way more cool air is inspirated into the fiberizing area by the flow of cool air out of the nozzles 172. Preferably, every other nozzle 172 is connected to the same manifold. Usually the same pressure is maintained in both manifolds, e.g. 15–20 psig, but the air to one of the manifolds can be turned off if longer fibers are desired. Ring 160 functions as a safety guard and also to channel the air coming from, and induced by, nozzles 172 along the outer peripheral wall of the rotor.

A conventional binder is added to the fibers by a plurality of V-jet nozzles 158 (producing a fan shaped spray) spaced around a manifold 156. The binder is fed to manifold 156 entrained in an air stream supplied by manifold 150. Air passing through pipes 152, four such pipes are located around the manifold 150 at 90° intervals, mixes with binder coming from binder manifold 154 via connector pipe 153. Fibers produced by the rotor and mixed with binder are directed downwardly into a collection chamber 122 as described above.

In describing the invention certain embodiments have been used to illustrate the invention and the practice thereof. However, the invention is not limited to these specific embodiments as other embodiments and modifications within the spirit of the invention will readily occur to those skilled in the art of reading this specification. The invention is thus not intended to be limited to the specific embodiments disclosed, but instead it is to be limited only by the claims appended hereto.

We claim:

1. A method of producing staple fibers of finite length and having an average diameter of less than about 7 microns from molten mineral material comprising:

a. introducing said molten material at a rate of hundreds of pounds per hour into a rotating rotor internal of a peripheral wall of the rotor, said peripheral wall containing orifices each having an initial diameter no greater than about 18 mils, b. passing said molten material through said orifices to form primary fibers having an average diameter of less than about 7 microns without using hot gas blast attenuation, c. forming around but spaced from said peripheral wall a series of streams of moving gas separated by a series of relatively quiescent zones, d. moving said gas in said streams in a direction transverse to the direction of movement of said primary fibers, and e. passing said primary fibers into said quiescent zones and into contact with said streams of moving gas, said gaseous streams having a temperature and velocity sufficient to break said primary fibers into staple fibers, but insufficient to cause any significant attenuation of said fibers.

2. A method as defined in claim 1 and further comprising:

a. confining said moving gas prior to the formation of said streams of moving gas, and b. introducing said gas into the atmosphere surrounding said peripheral wall at a pressure of about 5 psig to form said streams of moving gas.

3. A method as defined in claim 2 and further comprising:

a. introducing said gas into said atmosphere surrounding said peripheral wall in a plane substantially coplanar with the upper edge of said peripheral wall.

4. A method as defined in claim 3 and further comprising:

a. introducing said gas into said atmosphere from an orifice having a diameter of about ⅛ inch.

5. A method as defined in claim 4 and further comprising:

a. forming at least 20 streams of moving gas.

6. In an apparatus for producing primary fibers having an average diameter of less than about 7 microns from a molten mineral material at a rate of hundreds of pounds per hour wherein the molten mineral material is introduced into a rotating rotor internal of a peripheral wall of the rotor and wherein said peripheral wall contains orifices each having an initial diameter no greater than 18 mils and wherein said molten material is passed through said orifices to form said primary fibers without using hot gas blast attenuation, the improvement comprising:

a. means for breaking said primary fibers into staple fibers, b. said means comprising means for forming around but spaced from said peripheral wall a series of streams of moving gas separated by a series of quiescent zones, said streams having a temperature and velocity sufficient to break said primary fibers into staple fiber but insufficient to significantly attenuate said primary fibers, and c. said means directing said streams of moving gas in a direction transverse to the direction in which said primary fibers are formed so that said primary fibers enter into said quiescent zones and into contact with said streams of moving gas to be broken into staple fibers.

7. Apparatus as defined in claim 6 wherein said means (b) and (c) comprises:

a. at least one circular manifold having a series of nozzles depending from said manifold and spaced circumferentially from each other.

8. Apparatus as defined in claim 7 wherein:

a. said nozzles are provided with orifices through which said streams of gas pass, and b. said orifices are located substantially coplanar with the upper edge of said peripheral wall.

9. Apparatus as defined in claim 8 wherein:

a. said manifold has at least twenty nozzles depending therefrom.

10. Apparatus as defined in claim 8 and further comprising:

a. at least one additional circular manifold having a plurality of nozzles depending therefrom, b. said nozzles in said additional circular manifold being offset circumferentially with respect to said nozzles on said first circular manifold, and c. all of said nozzles being spaced equidistantly in a radial direction from said peripheral wall.

* * * * *